Figure 1:
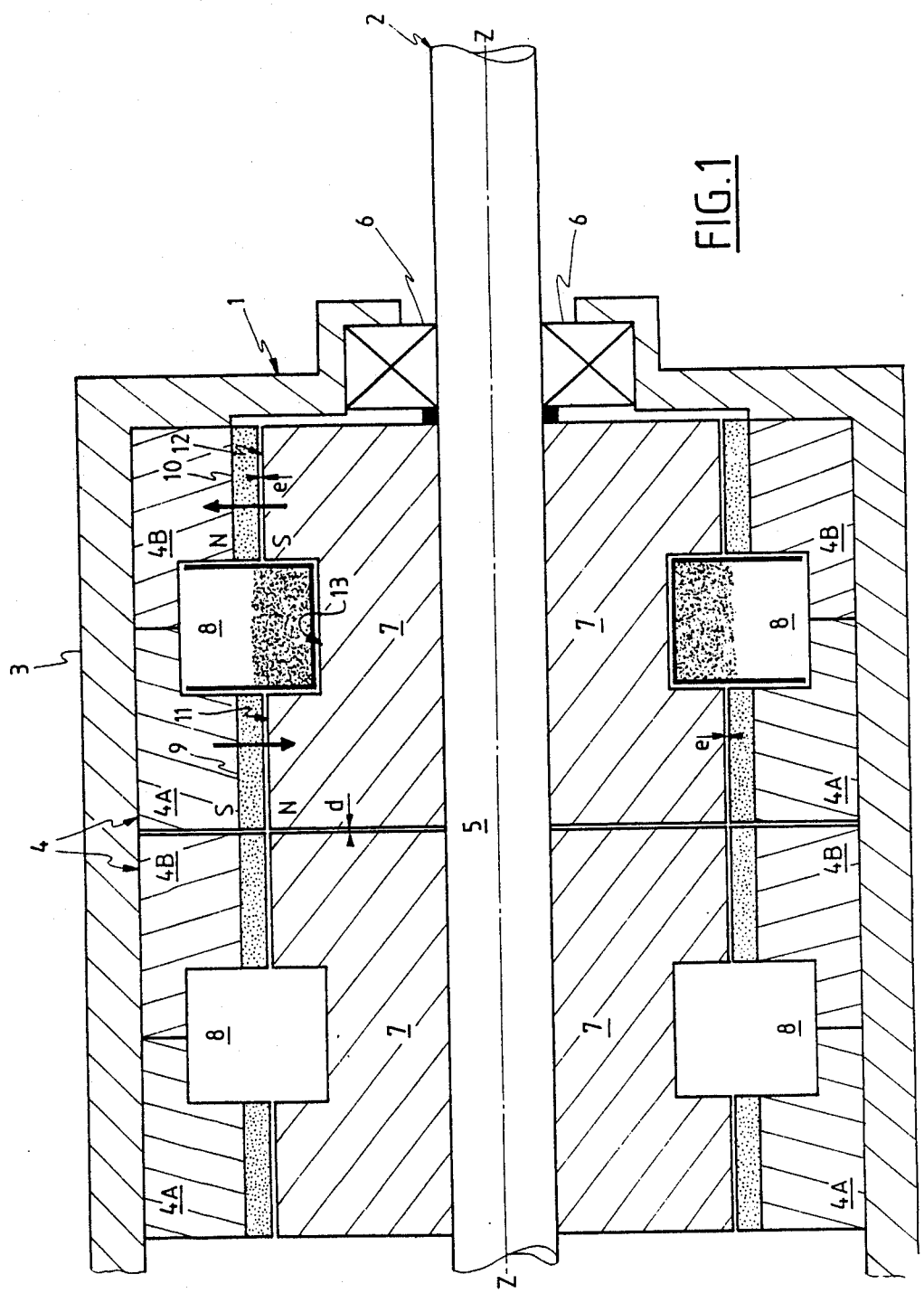

United States Patent [19]

Rossi

[11] Patent Number: 4,933,585

[45] Date of Patent: Jun. 12, 1990

[54] HIGH PERFORMANCE ELECTRIC MACHINE RESISTANT TO LOSSES CAUSED BY THE JOULE EFFECT

[76] Inventor: Rinaldo J. C. Rossi, 49 avenue Paul Doumer, 75116 Paris, France, 75116

[21] Appl. No.: 258,639

[22] Filed: Oct. 17, 1988

[30] Foreign Application Priority Data

Oct. 16, 1987 [FR] France ............................... 87 14312

[51] Int. Cl.$^5$ ............................................. H02K 21/00
[52] U.S. Cl. .................. 310/162; 310/49 R; 310/154
[58] Field of Search ...................... 310/49 R, 154, 155, 310/162, 163, 164, 266, 268

[56] References Cited

U.S. PATENT DOCUMENTS

| | | | |
|---|---|---|---|
| 3,469,133 | 9/1969 | Stcherbatcheff | 310/164 |
| 4,088,909 | 5/1978 | Matsumura et al. | 310/49 R |
| 4,224,544 | 9/1980 | McKinnon et al. | 310/49 R |
| 4,465,950 | 8/1984 | Guttinger | 310/162 |

FOREIGN PATENT DOCUMENTS 0072774 3/1983 European Pat. Off. .
3001095 7/1981 Fed. Rep. of Germany .
2362516 3/1978 France .
521045 5/1972 Switzerland .
2069766 8/1981 United Kingdom .

OTHER PUBLICATIONS

Moteurs discoides a reluctance variable et a aimants permanents: des couples specifiques eleves a faible vitesse, J. Lucidarme, C. Rioux, Laboratoire d'Electrotechnique d'Orsay (Universite Paris VI et XI), Moteurs Electroniques De Puissance, pp. 40–52.

*Primary Examiner*—Peter S. Wong
*Assistant Examiner*—Judson H. Jones
*Attorney, Agent, or Firm*—Browdy and Neimark

[57] ABSTRACT

A polyphase electrical machine has a fixed member and a mobile member and for each electrical phase there is a corresponding single inductive coil. The fixed member has at least one permanent bar magnet determining an air gap with a plurality of teeth carried by the mobile member so that the magnetic field lines close across fixed and mobile magnetic bodies and across bar magnets.

20 Claims, 7 Drawing Sheets

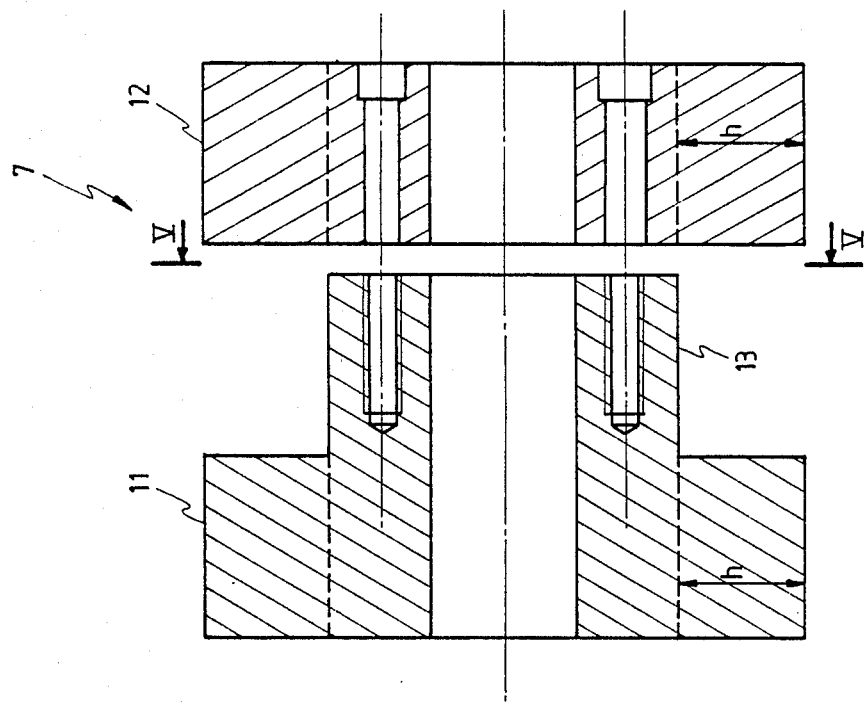
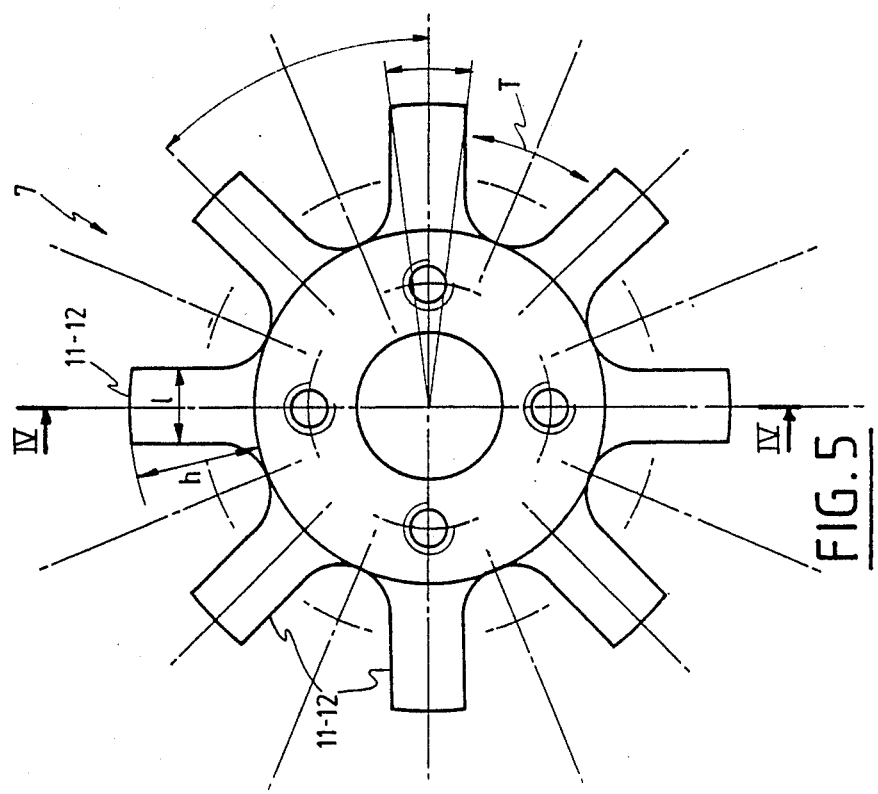
FIG.4
FIG.5

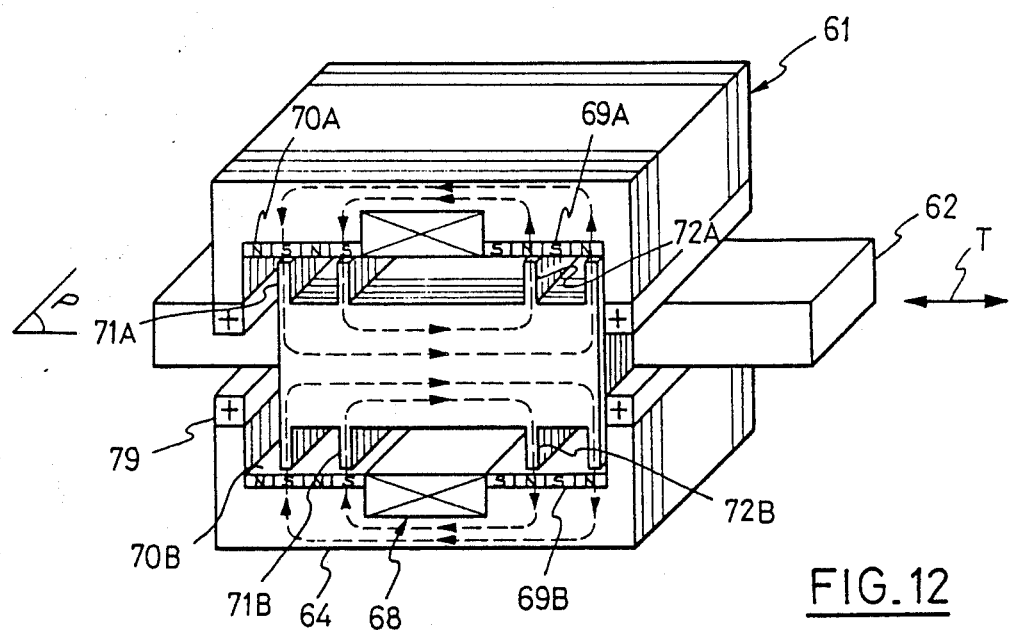
FIG_12
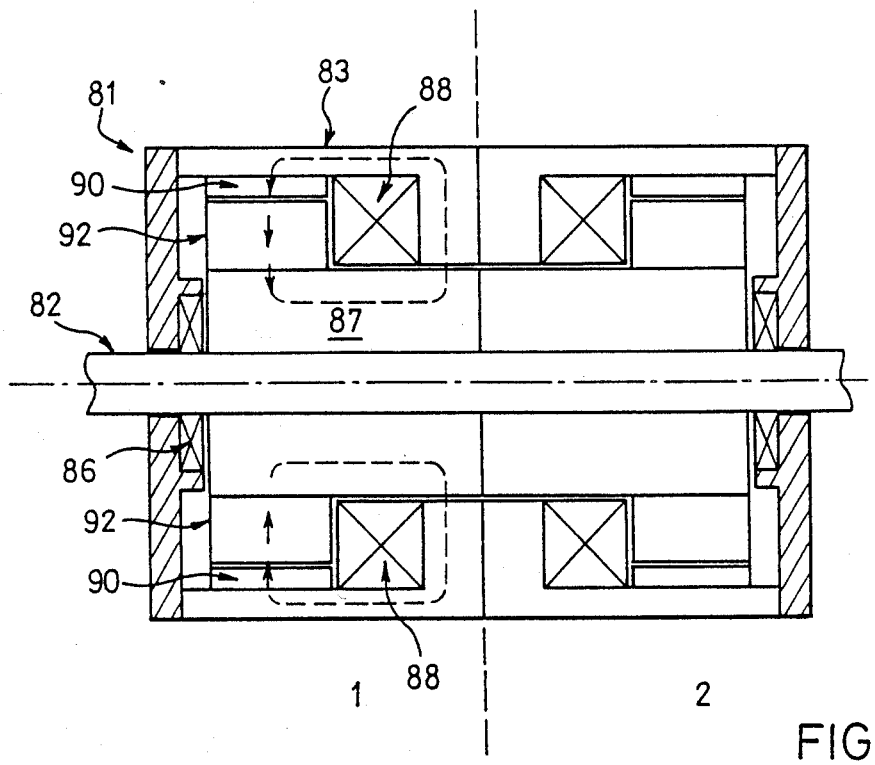
FIG_13

HIGH PERFORMANCE ELECTRIC MACHINE RESISTANT TO LOSSES CAUSED BY THE JOULE EFFECT

The invention concerns electrical machines (motors or alternators) consisting of a rotor coaxial with a stator and rotating freely with respect to the stator about a common axis, the rotor and stator having magnetic poles facing them and inductor means (windings, exciters or receiver-alternators) and permanent magnets designed to establish a correlation between the relative rotor/stator rotation and the current flowing in the inductor means.

According to French document FR-2.588.132, a disk armature motor with axially magnetised permanent magnets is already known; the permanent magnets therein are at least in part carried by the rotor and the inductor means therein are annular windings carried by the stator and coaxial with it, disposed radially outside the magnetic poles.

The invention concerns a very high performance electrical machine, easy and inexpensive to produce, and having in particular, when used as a motor, high specific torque and low inertia along with low losses through the JOULE effect, at the same time achieving, if the machine is polyphase, a high level of magnetic decoupling between the phases of such a motor.

The invention thus proposes an electrical machine with at least one phase comprising a mobile body admitting a degree of freedom with respect to a fixed body, comprising for each phase:
a mobile member of soft magnetic material linked to the mobile body and having at least one plurality of identical polar teeth projecting towards the fixed body in a direction perpendicular to their trajectories, all the teeth of this mobile member admitting a plane of symmetry perpendicular to their trajectories,
a fixed member of soft magnetic material linked to the fixed body and having, facing the polar teeth with which it determines a constant discontinuous air gap (e), at least one permanently, periodically magnetised bar magnet linked by a magnetic body and having, in the direction of the plurality of teeth, and perpendicular to the air gap, a magnetising component which varies periodically along the bar, according to a predetermined angular period, so as to determine alternating poles, with one pair of poles for each polar tooth,
and a single inductive winding around one of the magnetic bodies of the fixed and mobile members,
whereby field lines can close across said bodies passing through the polar teeth and said constant air gap, the permanent bar magnet and a second air gap defined between the fixed and mobile members.

The association of N individual machines can thus constitute, in particular, an electric stepper motor, a brushless electronic switching motor or an N phase alternator.

The invention applies particularly well to robotics, high performance electromechanical servosystems, stepper motors and, for example, limited clearance motors for the control of servovalve distributors.

The main advantages of the invention for the construction of motors are:
very high specific torque (3 to 10 mN/kg), taking into account the large possible number of pairs of poles along with low losses through the JOULE effect, dissipated in the stator of the machine,
low rotor inertia, when the thickness of a tooth is only one third to one quarter of the polar pitch,
practical construction comprising only parts of simple geometric shape which are therefore easy to machine; the winding, being reduced to a circular coil, poses no construction problems.

It is possible to construct machines the phases of which are magnetically decoupled which eliminates the problems of mutual inductance between phases, which cause difficulties in the switching logic circuits of stepper motors for example.

It is possible to construct inexpensive stepper motors by casting the stator and rotor from a ferrite material and using multiple pole ferrite permanent magnets.

It is possible to construct machines having high "currentless" torque, which can be useful in the case of a stepper motor application.

Conversely, through compensation of the "currentless torque" of the different phases, or by using inclined rotor teeth, it is possible to reduce this unwanted torque to very low values.

Low self-inductance because permanent magnets with relative permeability close to 1 (samarium-cobalt, ferrite, etc) form the essential element of the machine's air gap. This is particularly important for a stepper motor application.

A suitable choice of tooth width with respect to the polar pitch enables a flux due to the magnets which is largely sinusoidal to be obtained in the exciter coil. This involves an emf in the coil with little harmonic distortion, which is advantageous in an alternator application or for the micro-step control of stepper motors.

The mutual torque between magnets and coil can be almost sinusoidal and linear as a function of current even for high currents (little magnetic saturation).

The rotor (or armature) of the machine, which can be a "solid" member, can accept high rotation speeds without mechanical damage which, associated with a high specific torque, leads to very high specific power levels. This is particularly true in the construction of multiple pole, high frequency on-board alternators.

The volume occupied by the coil affects only the coil resistance and can therefore be altered according to the use of the machine (steady state or pulsed mode).

According to the preferred embodiments of the invention, advantageously combined:
the fixed member of soft magnetic material has, facing the polar teeth with which it determines the two air gaps, two permanently magnetised bar magnets linked by a magnetic body, the plurality of polar teeth of the mobile members being divided at any time into at least two series of the same number, linked by a magnetic body, such that for each tooth of one series facing one pole of a bar there is a corresponding tooth of the other series facing an opposite pole of the other bar.
with the mobile member freely rotating with respect to the fixed member, the permanently magnetised bar magnets are inwardly curved to constitute at least partial rings,
the permanently magnetised bar magnets are shaped as axially displaced rings, the magnetic field lines closing in axial planes and the inductive winding being coaxial with the mobile member,
the permanently magnetised rings are disposed radially facing series of teeth and are radially magnetised, the permanently magnetised rings are disposed radially facing series of teeth, which are indistinguishable, these rings being magnetised axially, the permanently magnetised bar magnets are shaped as two radially opposite half-rings, the magnetic field lines closing in transverse planes and the inductive winding being disposed in an axial plane, the fixed and mobile members are transversely laminated in the axis of rotation of the mobile member, the mobile member is disposed inside the fixed member, the mobile member is mobile in translation with respect to the fixed member, the bar magnets being parallel to the trajectory of this mobile member, the bars and series of teeth are disposed on either side of a plane of symmetry parallel to the trajectory of said mobile member, the fixed and mobile members are laminated in a perpendicular direction to the trajectory of the mobile member, the bar magnets are formed from alternating polarity magnets, the rotor rings have identical teeth, and have equal diameters, the stator rings also having equal diameters, each permanently magnetised stator ring is formed from permanent magnets having a circumferential magnetising component which is negligible, each permanently magnetised stator ring, along one circumference, a non-zero circumferential magnetising component which varies periodically with the same period as the radial magnetising component but with a phase difference of $\pi/2$, each ring is formed from magnets the magnetising effect of which at each point forms a constant angle ($\alpha$), apart from the sign, with a radius passing through this point and a substantially constant modulus, each ring has, along one circumference, a permanent magnetisation of constant modulus, the radial and circumferential components of which vary approximately sinusoidally, an axial space is made between two adjacent stator or rotor members associated with different electrical phases, each of the rotor and stator members is in two parts obtained by casting.

Figure 3:
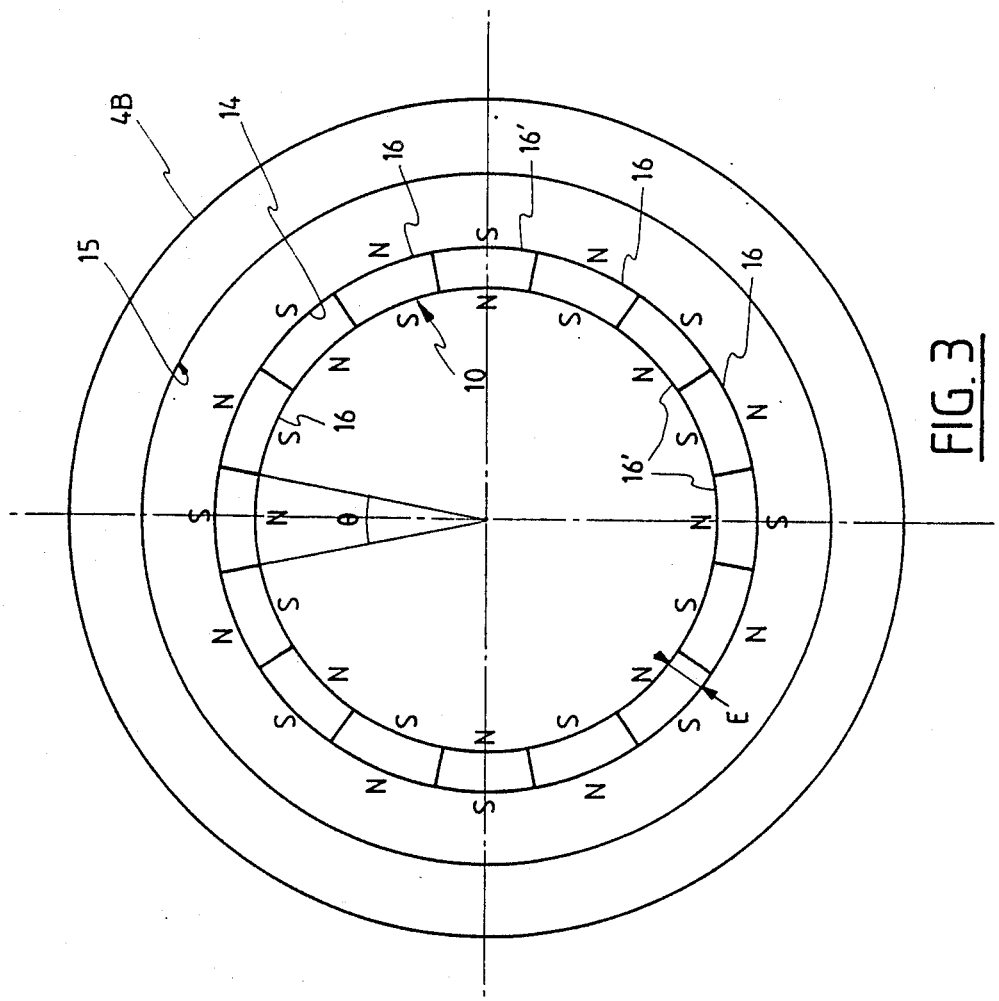
Figure 2:
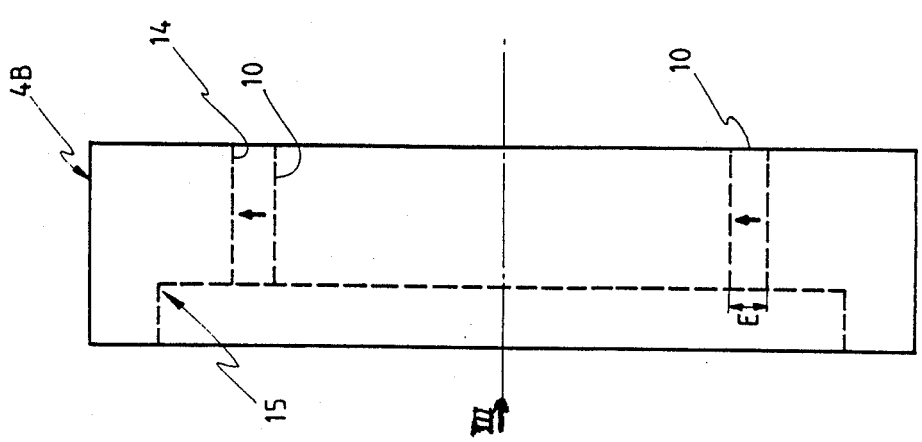
Figure 6:
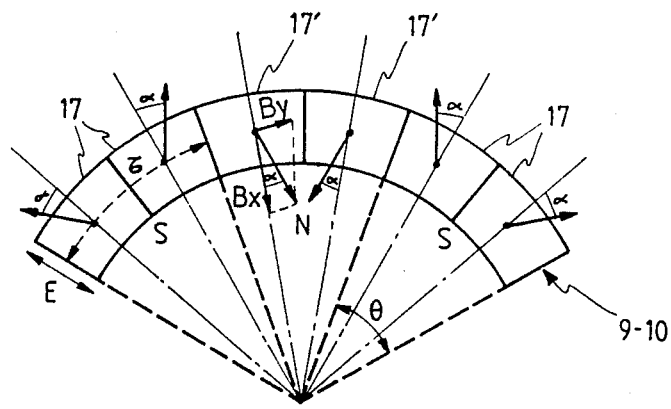
Figure 7:
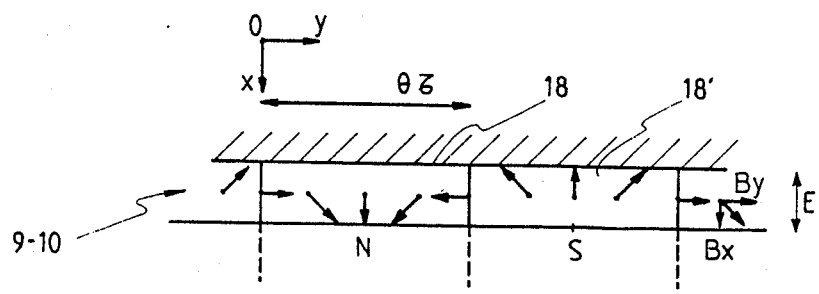
Figure 8:
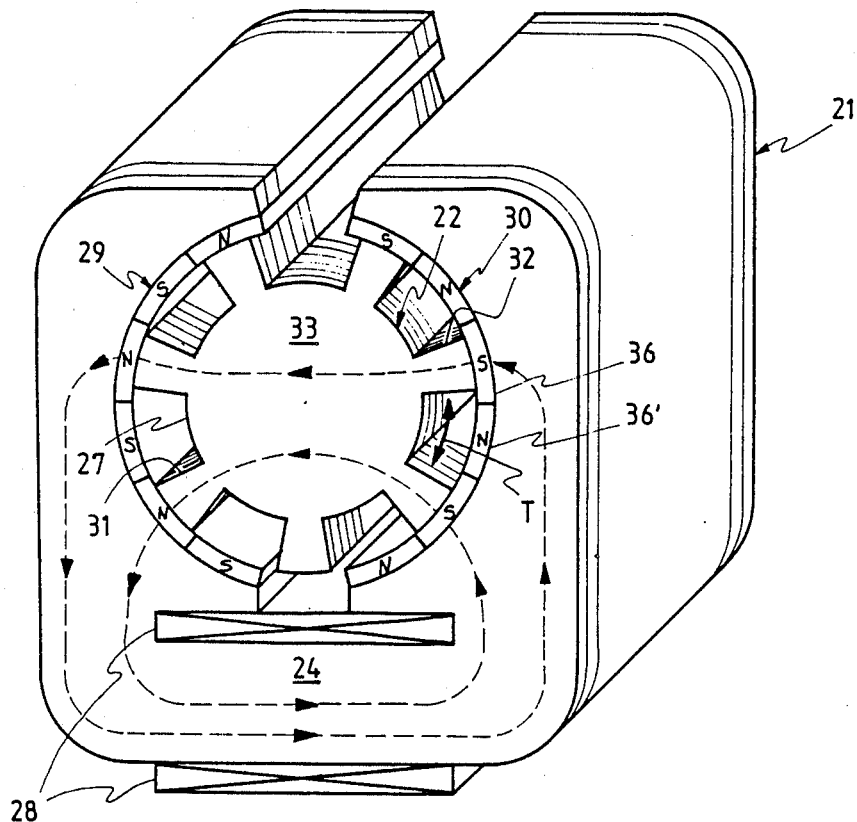
Figure 9:
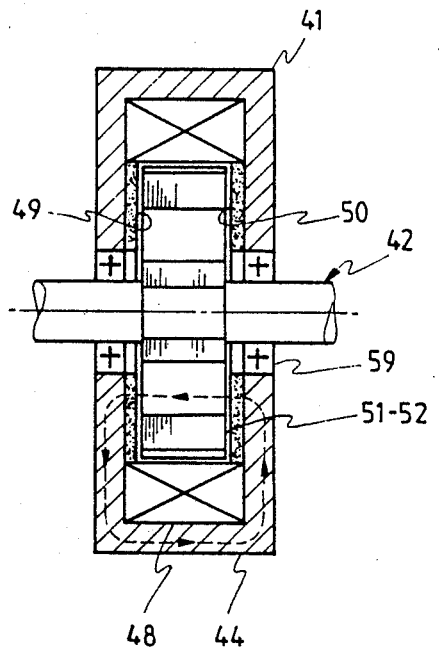
Figure 10:
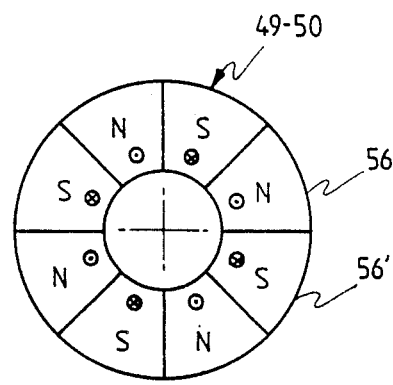
Figure 11:
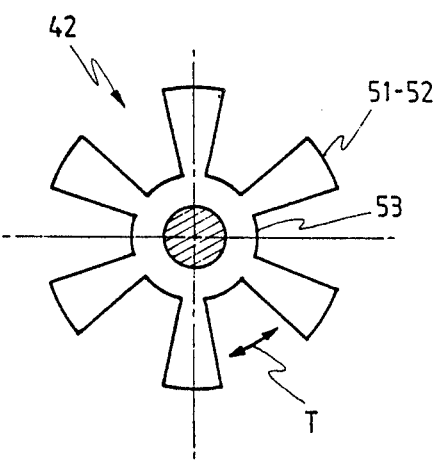

Objects, advantages and characteristics of this invention will be seen from the following description, given by way of non-limitative example, and with regard to the enclosed drawings on which:

FIG. 1 is a partial schematic view in axial section of a polyphase electrical machine according to the invention, FIG. 2 is a side view of one of the two stator frames in FIG. 1, FIG. 3 is a left view, according to the arrow III in FIG. 2, said frame including a permanent ring magnet, FIG. 4 is an exploded view in axial section of the rotor in FIG. 1, along the line IV—IV in FIG. 5, FIG. 5 is a front view, along line V—V in FIG. 4, FIG. 6 is a detailed partial schematic view illustrating an alternative embodiment of the permanent ring magnet in FIG. 3, FIG. 7 is a similar schematic view showing another embodiment, the permanent ring magnet being flattened for clarity of the drawing, FIG. 8 is a partial schematic view in perspective with cross section of a revolving cylinder motor according to another embodiment of the invention, FIG. 9 is a partial schematic view in axial section of another revolving cylinder motor according to the invention, FIG. 10 is a front view of a ring magnet forming part of the motor in FIG. 9, FIG. 11 is a front view in partial section of the rotor of the motor in FIG. 9, FIG. 12 is a partial schematic view in perspective with longitudinal section of a linear motor according to the invention, and FIG. 13 is a variant of FIG. 1.

FIG. 1 is a schematic representation of an electrical machine with several electric phases, which comprises, conventionally, a fixed structure 1 forming a stator and a mobile assembly 2 forming a mobile rotor rotating with respect to the stator about an axis Z—Z.

The stator 1 mainly comprises a casing 3 having inside stator members 4 which will be detailed further on, while the rotor 2 mainly comprises a central shaft 5 guided in rotation by bearings 6 of any suitable type and maintained axially with respect to the stator by conventional securing members not shown. Said central shaft 5 similarly has rotor members 7 which will be detailed further on.

Said machine also comprises inductive members including windings 8 connected by means not shown to external electric equipment of any known suitable type.

According to the way in which the machine is used, the rotor is rotated with respect to the stator driven by the effect of currents flowing in the windings (electric motor mode); conversely, electric current is generated in the windings 8 because of a relative rotation of the rotor with respect to the stator.

The electrical machine in FIG. 1 is modular in the sense that it comprises one module 4+7 for each electric phase N in said machine, said identical modules being such that the rotors are mechanically offset with respect to the stators by an angle $\pi/n$ from one phase to the next.

FIG. 1 shows two modules disposed axially side by side, the modules being magnetically decoupled as will be described further on. In fact, the lefthand module is represented more schematically than that on the right.

The stator member 4 of each module comprises a magnetic frame equipped with two radially salient and permanently magnetised ring magnets 9 and 10, with a radial magnetising component which varies periodically along the circumference of said rings according to a predetermined angular period so as to form an annular succession of P pairs of radially alternating N-S magnetic poles. In addition, the radial magnetising components are of opposite direction in every pair of axially opposite points on said permanent rings magnets. Thus if, in the upper part of FIG. 1, the magnetic flux flows downwards in the lefthand ring 9, it flows upwards in the righthand ring 10.

The rotor member 7 of each module comprises a magnetic frame formed from,. two discontinuous ring magnets linked by a magnetic sleeve 13 linked to the shaft 5 and each formed from a plurality of D radially salient polar teeth 11 and 12 facing the ring magnets 9 and 10, permanently magnetised $\vec{B}$ with which they define air gaps of thickness e. The poles are magnetised transversely to the trajectories T of the teeth.

Each module comprises an annular inductive winding 8 mounted on the stator coaxially with it, being disposed axially, partly between the permanent magnet stator rings 9 and 10 and partly between the discontinuous rings of polar teeth 11 and 12. This winding is connected in known manner to an AC source not shown.

Because of this, in any axial section such as that shown in FIG. 1, the magnetic flux circulates about the winding 8 across permanent magnets and air gaps, here disposed axially on either side of said winding.

In a simplified embodiment, the stator can have a single ring magnet 9 or 10 facing a single series of teeth, the other ring being replaced by magnetic material, the spaces between associated polar teeth being filled in. Although simplified, such a structure offers in substance the advantages of the invention. An example of it is given in FIG. 13 where parts corresponding to those in FIGS. 1 to 5 have reference numbers which are derived from the reference numbers of FIGS. 1-5 by adding 80 to those reference numbers. This FIG. 13 illustrates a revolving cylinder motor, each phase of which comprises a single ring magnet 90 and a single series of teeth 92, while the other air gap is continuous with a constant thickness between the stator members 81 and rotor members 87 of soft magnetic material permitting the return of the flux. This air gap here has the diameter of the hub of the rotor member 87 which is thus very easy to produce, since it has only one radially mounted ring.

This embodiment, easy to assemble and produce applies particularly well to a compact two phase machine.

There is an axial space d between the magnetic frames of two adjacent modules through which a high level of magnetic decoupling of these modules is achieved.

From the construction point of view, as can be seen from FIGS. 2 and 3, the stator frame 4 of each module consists of two similar half frame 4A and 4B secured back to back by any suitable means.

Each half frame is shaped as a torus with a ring magnet 14 radially salient in an inward direction bordering a half channel 15 designed to accommodate the winding 18 and intended to support, on the section of it radially turned towards the axis, the above mentioned ring 9 or 10.

In FIG. 3, the ring magnet 10, the radial dimension or thickness of which is marked E, is formed from an annular series of 2P permanent magnets 16 and 16' radially magnetised in the form of tiles, with alternating magnetising directions. The circumferential magnetising component of these magnets is negligible.

In the embodiments in FIGS. 6 and 7, the ring magnets 9 or 10 are formed from magnetic poles having a magnetisation of substantially constant modulus, with a non-zero circumferential magnetising component By, which varies periodically with the same period as Bx but with a phase difference of $\pi/2$.

Thus in FIG. 6 the ring in question is formed from pairs of magnetised tiles 17 and 17'; the angle formed by the magnetising vector and each point of a tile with a radius linking this point to the axis has a given value between 0° and 45°, to be optimised according to the number P of pairs of poles. In this way, a regular assembly of pairs of poles is obtained in which each pole comprises two magnetised tiles 17 and 17' disposed top to bottom and occupying an angular sector $\theta$ equal to $\pi/p$ corresponding to a length of arc $\tau$. This assembly of poles can be constructed in particular for $\alpha=0$, in a single piece with a multiple pole radial magnetisation of a ring of hard magnetic material (samarium cobalt, ferrite, etc). Samarium cobalt magnets of the type sold by SEIKO EPSON CORPORATION under the references SAM or SAMLET may be used.

In the embodiment in FIG. 7, shown in developed form, the ring magnets 9 and 10 comprise magnetised tiles 18 and 18' the radial magnetising components Bx and circumferential magnetising components By of which vary approximately sinusoidally, with a difference of $\pi/2$. This type of magnetisation can be obtained with magnets of the abovementioned type-reference SAM 5 or SAMLET 3, or iron and rare earth based magnets such as those sold by GENERAL MOTORS under the name MAGNEQUENCH.

Said frame 4 can be constructed of soft magnetic material (powdered iron blocks, laminated sheet metal or moulded ferrite). The choice of material depends of course on the intensity of the flux which must circulate in the stator for each phase.

The construction of the rotor member 7 is shown in FIGS. 4 and 5. This member is in two disymmetrical parts, one part comprising the discontinuous ring of teeth 11 and the sleeve 13 and one part having the discontinuous ring of teeth 12. These polar teeth regularly distributed from the angular point of view are here identical, with a radial dimension h called height and a circumferential dimension 1 called width. In fact the geometric form of the teeth matters little. These parts 11, 13 and 12 are secured together by any suitable means, here with screws which penetrate the sleeve and the heads of which are lodged in the part carrying the teeth 12.

These parts are of a soft magnetic material, powdered iron block or an association of laminated sheet metal or moulded ferrite The number D of teeth of each ring is here equal to the number P of pairs of poles, that is 8 in the example given.

The teeth of the rotor and the polarities of the magnets of the two half frames 4A and 4B are positioned so that the magnetic potential of the magnets facing the poles of the rotor are added together and the magnetic flux thus created by the magnets through the coil 8 varies almost sinusoidally as a function of the angular position of the rotor with respect to the stator.

A rotor tooth width 1 between 0.25 and 0.35 of the polar pitch $2\tau$ enables an almost sinusoidal flux to be obtained across the coil.

In addition, it is possible to incline the poles of the rotor with respect to the rotor axis to eliminate certain harmonics of the retention torque due to the magnets in the absence of current in the coil (a technique similar to that of skewing the slots in conventional electric motors). A similar result can be obtained by inclining magnetised poles of the stator with respect to the motor axis. For example for a two phase motor, the two phases being offset by $\pi/2$ electrical radians ($\pi/2P$ mechanical radians), harmonic 2 of the currentless retention torque is eliminated naturally and harmonic 4 is doubled. It is possible to eliminate said harmonic 4 by inclining the poles of the rotor by an angle $\pi/2P$ with respect to the axis of the rotor. It should be noted that harmonic 1 of the currentless retention torque is zero and that the other odd harmonics are very low.

The choice of the rotor tooth width 1 with respect to the polar pitch is used to enhance the harmonic 2 or 4 of the currentless retention torque. For a ratio $1/(2\tau)$ of the order of 0.4, harmonic 2 is more in evidence and for a ratio of 0.25 to 0.35 harmonic 4 is more in evidence.

The choice of thickness E of the magnet with respect to the polar pitch $2\tau$ is not critical and depends on the application. However a ratio τ/E is selected between 3 and 6 for optimum performance.

The choice of the angle α which defines the axis of magnetisation with respect to the radius is used to obtain the flux picked up by the poles of the rotor. A value of 20° to 30° for α seems optimum. In addition for ≃30°, harmonic 4 of the currentless torque is very low by choosing the correct tooth width (1/(2τ)≃0,33), which can be advantageous for a two phase machine.

The ideal solution would be to obtain a sinusoidal direction of magnetisation (in accordance with FIG. 7) which gives a currentless torque comprising only harmonic 2 and a flux picked up by the coil almost without harmonic distortion and of high value.

The height of the rotor h is at least τ.

The air gap e between the magnets and the rotor teeth must be reduced to the minimum compatible with the mechanical construction constraints. A value $e \leq 0.15$ mm will be used if possible The unfavourable influence of the air gap becomes more noticeable as the thickness of the magnets is reduced (machine of small size or with a large number of pairs of poles).

The soft magnetic material parts can be produced by moulding iron powder based material of the COROVAC EF 606 type or of ferrite for less high performance but more economical machines, or by a combination of laminated metal sheets.

The permanent magnets may be constructed in a single piece by casting and multiple pole magnetisation, or by bonding magnetised tiles onto the stator frames.

FIGS. 8 to 12 show different embodiments of one phase of an electrical machine presenting the advantages of the invention.

FIG. 8, on which the parts corresponding to those in FIGS. 1 to 5 have reference numbers derived by adding 20 to the reference numbers of FIGS. 1-5, shows a motor phase in which the magnetic fluxes close in transverse planes across semi-annular disconnected series 29 and 30 formed from radially magnetised magnets 36 and 36'. These series of magnets form two inwardly curved bars determining a cylindrical channel in which the rotor 27 is located comprising at any time equal numbers of teeth 31-32 facing both of the bars. These teeth are disposed so that for each tooth facing a north (or south) pole of one of the bars there is a corresponding tooth facing a south (or north) pole of the other bar, which provides for an approximately radial circulation of the magnetic flux across the rotor. These bars 29 and 30 are linked through a body 24 of soft magnetic material engaged inside an inductive coil 28 disposed in an axial plane.

To reduce the magnetic losses, the rotor 22 and the stator 21 are laminated perpendicularly to the axis of the motor.

The electric motor in FIGS. 9 to 11 on which the parts corresponding to those in FIGS. 1 to 5 have reference numbers which are derived by adding 40 to the reference numbers of FIGS. 1-5, have axially magnetised ring magnets 49, axially facing one ring of teeth 51-52 which are axially traversed by magnetic fluxes and each of which is simultaneously facing a south pole of one of the rings and a north pole of the other ring.

Bearings 59 are shown here.

Finally, the linear motor in FIG. 12 in which the corresponding parts have reference numbers which are derived from those in FIGS. 1 to 5 by adding 60 to the reference numbers of FIGS. 1-5, is distinguished from the revolving cylinder motor in FIG. 1 by the fact that the ring magnets 9 and 10 are replaced by longitudinal bars 69A-69B and 70A and 70B. In addition, the polar teeth consist of two pairs 71A and 71B and 72A and 72B on either side of a horizontal plane P containing the trajectory T of the member 62 mobile in translation while sliding on bearing 79.

This motor here admits a horizontal plane of symmetry but it should be understood that the teeth and the magnets of the upper (or lower) part may be omitted: elements A and B are redundant.

The same embodiments as in FIGS. 6 and 7 can be applied to the the motors in FIGS. 8, 9 and 12.

In the embodiments of FIGS. 8 et seq, it will be appreciated that it is possible in very simplifed versions to use only one bar or ring magnet.

This invention has been described by way of indication but is in no way limitative and the invention is susceptible to many embodiments.

It will be appreciated that, according to the invention, the polar teeth are solid in form, which makes them compatible with the flux levels of the facing permanent magnets (these being chosen from high performance material): their section, substantially constant, allows the flux in the coils and magnets to circulate without saturation.

These teeth have the same angular offset with respect to the poles of the stator to within an integral multiple of π/P (where P is the number of pairs of poles).

The alternating poles provide the same function with respect to all the polar teeth facing a single bar.

The various dimensional relationships stated above are advantageously, but not necessarily, combined.

I claim:

1. An electric machine with at least one phase comprising
   a fixed body;
   and a mobile body having a degree of freedom with respect to said fixed body;
   each phase comprising
   a mobile member of soft magnetic material linked to said mobile body and having at least one plurality of identical polar teeth projecting towards said fixed body in a direction perpendicular to their trajectories, said teeth of said mobile member having a plane of symmetry perpendicular to the trajectories of said teeth;
   a fixed member of soft magnetic material linked to said fixed body and having, facing said polar teeth with which it determines a constant discontinuous air gap, at least one permanently, periodically magnetised bar magnet linked by a magnetic body and having, in the direction of said plurality of teeth, and perpendicular to said air gap, a magnetising component which varies periodically along said bar magnet, according to a predetermined angular period, so as to determine alternating poles, with one pair of poles for each polar tooth;
   a second air gap defined between said fixed and mobile members;
   and a single inductive winding around one of said fixed and mobile members;
   said mobile and fixed bodies forming a closed path for field lines passing through said polar teeth, said constant air gap, said permanent bar magnet, and said second air gap.
2. The electric machine according to claim 1 wherein said fixed member of soft magnetic material has, facing said polar teeth with which it determines said two air gaps, two permanently magnetised bar magnets linked by said magnetic body, said plurality of polar teeth of said mobile member being divided at any time into at least two series of teeth of the same number, linked by a magnetic body, such that for each tooth of one series facing one pole of a said bar there is a corresponding tooth of the other series facing an opposite pole of said other bar.

3. An electric machine with at least one phase comprising a fixed body;

and a mobile body having a degree of freedom with respect to said fixed body;

each phase comprising a mobile member of soft magnetic material linked to said mobile body and having at least one plurality of identical polar teeth projecting towards said fixed body in a direction perpendicular to their trajectories, said teeth of said mobile member having a plane of symmetry perpendicular to the trajectories of said teeth;

a fixed member of soft magnetic material linked to said fixed body and having, facing said polar teeth with which it determines a constant discontinuous air gap, at least one permanently, periodically magnetised bar magnet linked by a magnetic body and having, in the direction of said plurality of teeth, and perpendicular to said air gap, a magnetising component which varies periodically along said bar magnet, according to a predetermined angular period, so as to determine alternating poles, with one pair of poles for each polar tooth;

a second air gap defined between said fixed and mobile members;

and a single inductive winding around one of said fixed and mobile members;

said mobile and fixed bodies forming a closed path for field lines passing through said polar teeth, said constant air gap, said permanent bar magnet, and said second air gap;

said fixed member of soft magnetic material having, facing said polar teeth with which it determines said two air gaps, said bar magnet and a second permanently magnetised bar magnet linked by said magnetic body;

said plurality of polar teeth of said mobile member being divided at any time into at least two series of teeth of the same number, linked by a magnetic body, such that for each tooth of one series facing one pole of a said bar there is a corresponding tooth of the other series facing an opposite pole of said other bar;

said permanently magnetised bar magnets being inwardly curved to constitute at least partial rings within which said mobile member freely rotates with respect to said fixed member.

4. Machine according to claim 3 wherein said permanently magnetised bar magnets are shaped as axially displaced rings, the magnetic field lines closing in axial planes and said inductive winding being coaxial with said mobile member.

5. Machine according to claim 4 wherein said permanently magnetised rings are disposed radially facing said series of teeth and are radially magnetised.

6. Machine according to claim 4 wherein said permanently magnetised rings are disposed radially facing said series of teeth, which are indistinguishable, these rings being magnetised axially.

7. Machine according to claim 3 wherein said permanently magnetised bar magnets are shaped as two radially opposite half-rings, the magnetic field lines closing in transverse planes and said inductive winding being disposed in an axial plane.

8. Machine according to claim 7 wherein said fixed and mobile members are transversely laminated in the axis of rotation of said mobile member.

9. Machine according to claim 3 wherein said mobile member is disposed inside the fixed member.

10. An electric machine with at least one phase comprising a fixed body;

and a mobile body having a degree of freedom with respect to said fixed body;

each phase comprising a mobile member of soft magnetic material linked to said mobile body and having at least one plurality of identical polar teeth projecting towards said fixed body in a direction perpendicular to their trajectories, said teeth of said mobile member having a plane of symmetry perpendicular to the trajectories of said teeth;

a fixed member of soft magnetic material linked to said fixed body and having, facing said polar teeth with which it determines a constant discontinuous air gap, at least one permanently, periodically magnetised bar magnet linked by a magnetic body and having, in the direction of said plurality of teeth, and perpendicular to said air gap, a magnetising component which varies periodically along said bar magnet, according to a predetermined angular period, so as to determine alternating poles, with one pair of poles for each polar tooth;

a second air gap defined between said fixed and mobile members;

and a single inductive winding around one of said fixed and mobile members;

said mobile and fixed bodies forming a closed path for field lines passing through said polar teeth, said constant air gap, said permanent bar magnet, and said second air gap;

said mobile member being mobile in translation with respect to said fixed member, said magnets being parallel to the trajectory of said mobile member.

11. Machine according to claim 10 comprising bars and series of teeth disposed on either side of a plane of symmetry parallel to the trajectory of said mobile member.

12. Machine according to claim 10 wherein said fixed and mobile members are laminated in a perpendicular direction to the trajectory of the mobile member.

13. Machine according to claim 1 wherein said mobile member comprises a single series of teeth per phase, said second air gap being continuous and of constant thickness.

14. Machine according to claim 1 wherein bar magnets are formed from alternating polarity magnets.

15. Machine according to claim 1 wherein each permanently magnetised bar magnet formed from permanent magnets having a longitudinal magnetising component (By) which is negligible.

16. Machine according to claim 1 wherein each permanently magnetised bar magnet has along its length a non-zero longitudinal magnetising component (By), which varies periodically with the same period as the main transverse magnetising component but with a phase difference of $\pi/2$.

17. Machine according to claim 16 wherein each bar magnet is formed from magnets the magnetising effect of which at each point forms a constant angle ($\alpha$), apart from the sign, with a normal passing through this point and a substantially constant modulus.

18. Machine according to claim 16 wherein each ring has along one circumference a permanent magnetisation of constant modulus, the radial and circumferential components of which vary approximately sinusoidally.

19. Machine according to claim 1 wherein an axial space (d) is made between two neighbouring stator or rotor members associated with different electrical phases.

20. Machine according to claim 1 wherein said polar teeth of said mobile member have a height (h) at least equal to the length ($\tau$) of each pole of the facing bar magnet while its width (1) is between 0.25 and 0.35 of the length ($2\tau$) of each pair of poles, the radial thickness (E) of each bar magnet being between ⅓ and 1/6 of the length ($2\tau$) of each pair of poles.

* * * * *